United States Patent
Schick et al.

(10) Patent No.: US 7,010,996 B2
(45) Date of Patent: Mar. 14, 2006

(54) STEERING COLUMN CLAMPING DEVICE

(75) Inventors: Gary T. Schick, Goshen, CT (US); W. Richard Gist, Bristol, CT (US); Glenn DiCostanzo, Litchfield, CT (US)

(73) Assignee: Timken US Corporation, Torrington, CT (US)

( * ) Notice: Subject to any disclaimer, the term of this patent is extended or adjusted under 35 U.S.C. 154(b) by 187 days.

(21) Appl. No.: 10/385,885

(22) Filed: Mar. 10, 2003

(65) Prior Publication Data

US 2003/0221505 A1    Dec. 4, 2003

Related U.S. Application Data

(60) Provisional application No. 60/362,811, filed on Mar. 8, 2002.

(51) Int. Cl.
*B62D 1/16*    (2006.01)

(52) U.S. Cl. .................. 74/492; 74/493; 280/775
(58) Field of Classification Search .............. 74/492, 74/493; 280/775
See application file for complete search history.

(56) References Cited

U.S. PATENT DOCUMENTS

| | | | |
|---|---|---|---|
| 2,814,372 A | 11/1957 | Hussa | |
| 3,991,859 A | 11/1976 | Coulter et al. | |
| 4,118,013 A | 10/1978 | Christison et al. | |
| 4,244,237 A | 1/1981 | Sprunger | |
| 4,357,810 A | 11/1982 | Kumpar | |
| 4,541,298 A | 9/1985 | Strutt | |
| 4,788,880 A | 12/1988 | Kester | |
| 4,938,613 A | 7/1990 | Griffin et al. | |
| 5,078,249 A | 1/1992 | Botterill | |
| 5,080,640 A | 1/1992 | Botterill | |
| 5,088,767 A | 2/1992 | Hoblingre et al. | |
| 5,106,349 A | 4/1992 | Botterill et al. | |
| 5,213,004 A | 5/1993 | Hoblingre | |
| 5,377,555 A | 1/1995 | Hancock | |
| 5,392,667 A * | 2/1995 | Courvoisier | 74/493 |
| 5,394,767 A * | 3/1995 | Hoblingre et al. | 74/493 |
| 5,528,950 A | 6/1996 | Organek et al. | |
| 5,655,413 A * | 8/1997 | Barton | 74/493 |
| 5,713,445 A | 2/1998 | Davis et al. | |
| 5,910,061 A | 6/1999 | Organek et al. | |
| 5,921,577 A | 7/1999 | Weiss et al. | |

(Continued)

FOREIGN PATENT DOCUMENTS

DE    3720783 C1    8/1990

(Continued)

*Primary Examiner*—David Fenstermacher
(74) *Attorney, Agent, or Firm*—Michael Best & Friedrich LLP

(57) ABSTRACT

A cam locking assembly for an adjustable steering column. The assembly includes a tie bolt that is secured relative to the steering column. A lever member is positioned for rotation about the tie bolt. A caming unit is positioned about the tie bolt adjacent the lever member. The caming unit has a roller assembly positioned between a pair of opposed cam plates. One of the cam plates is associated with the lever member and rotates therewith and the other plate is fixed relative to such rotation. Each cam plate has a plurality of ramped recesses on its internal surface such that rotation of the one plate causes the rollers to ride up the ramps such that the plates are pushed apart. The pushed apart ramps cause clamping upon the steering column to lock its position.

24 Claims, 4 Drawing Sheets

U.S. PATENT DOCUMENTS

| | | |
|---|---|---|
| 6,082,504 A | 7/2000 | Organek et al. |
| 6,083,137 A | 7/2000 | Kato et al. |
| 6,182,808 B1 | 2/2001 | Walton et al. |
| 6,237,735 B1 | 5/2001 | Walton et al. |
| 6,450,531 B1 * | 9/2002 | Rinker et al. ............... 280/775 |
| 2001/0023617 A1 | 9/2001 | Diemer |
| 2002/0084644 A1 * | 7/2002 | Rinker et al. ............... 280/775 |

FOREIGN PATENT DOCUMENTS

| | | |
|---|---|---|
| DE | 93 00 387.0 | 4/1993 |
| EP | 0592278 | 12/1996 |
| FR | 2 696 404 | 4/1994 |
| GB | 1153225 | 5/1969 |
| GB | 2 116 496 A | 9/1983 |
| GB | 2 240 383 A | 7/1991 |

* cited by examiner

STEERING COLUMN CLAMPING DEVICE

This application claims the benefit of U.S. provisional application No. 60/362,811 filed Mar. 8, 2002.

BACKGROUND

The present invention relates to adjustable steering columns. More particularly, the present invention relates to a cam locking assembly for use in conjunction with an adjustable steering column.

For user convenience, many vehicles provide a steering column that permits tilting or tilting and telescoping thereof to meet the users preferences. Upon proper adjustment, the steering column must be fixed to prevent movement of the steering column during vehicle operation. It is desired to provide a locking mechanism that allows relatively easy release to allow adjustment, but also provides adequate fixing of the steering column.

SUMMARY

The present invention provides a cam locking assembly for an adjustable steering column. The cam locking assembly includes a tie bolt that is secured relative to and extends from the steering column. A lever member is positioned for rotation about the tie bolt. A caming unit is positioned about the tie bolt adjacent the lever member. The preferred caming unit has a roller assembly positioned between a pair of opposed cam plates. One of the cam plates is associated with the lever member such that the plate rotates with the lever and the other plate is fixed relative to such rotation. Each cam plate has a plurality of ramped recesses on its internal surface such that rotation of the one plate causes the rollers to ride up the ramps such that the plates are pushed apart. The pushed apart ramps cause clamping upon the steering column in a locked position.

DETAILED DESCRIPTION OF THE PREFERRED EMBODIMENTS

Figure 1:
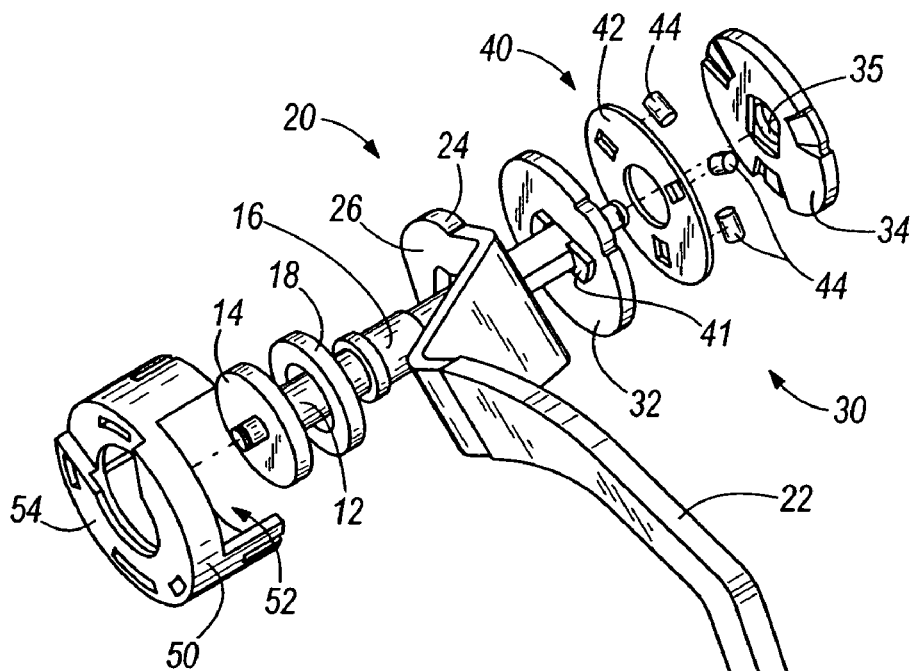
FIG. 1 is an exploded isometric view of a cam locking assembly in accordance with a first embodiment of the present invention.

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Referring to FIGS. 1–5, a first embodiment of a cam locking assembly 10 in accordance with a first embodiment of the present invention is shown. The cam locking assembly 10 generally includes a tie bolt 12, a thrust bearing assembly 18, a lever member 20 and a caming unit 30.

The tie bolt 12 terminates in a retaining plate 14 at one end and an is generally free at the opposite end 15. The retaining plate 14 may be an integrally formed flange, as illustrated, or the retaining plate 14 may be formed as a separate washer or the like secured along the tie bolt 12. The free end 15 is configured for securement relative to a steering column (See FIGS. 6 and 8). For example, the free end 15 is preferably threaded to receive a nut 17 or the like.

The lever unit 20 preferably includes an extending handle 22 connected to a plate 24. The plate 24 has an aperture 26 therethrough configured to receive the tie bolt 12 such that the plate 24 may be rotated thereabout. A sleeve member 16 may be provided about the tie bolt 12 to help facilitate rotation of the lever unit 20. If a sleeve member 16 is provided, the aperture 26 is configured to fit about the sleeve member 16. In the illustrated embodiment, the thrust bearing assembly 18 is positioned between the retaining plate 14 and the lever plate 24 to further facilitate rotation of the lever unit 20. The thrust bearing 18 may otherwise be positioned. For example, if the tie bolt 12 rotates with the lever unit 20, the thrust bearing 18 may be positioned between the steering wheel bracket 102 and the nut 17. Furthermore, more than one thrust bearing may be utilized. The thrust bearing assembly 18 can have various configurations, but generally comprises a plurality of roller elements retained in a cage or the like. The opposite side of the lever plate 24 is configured to engage the caming unit 30, as will be described in greater detail hereinafter.

Figure 3:
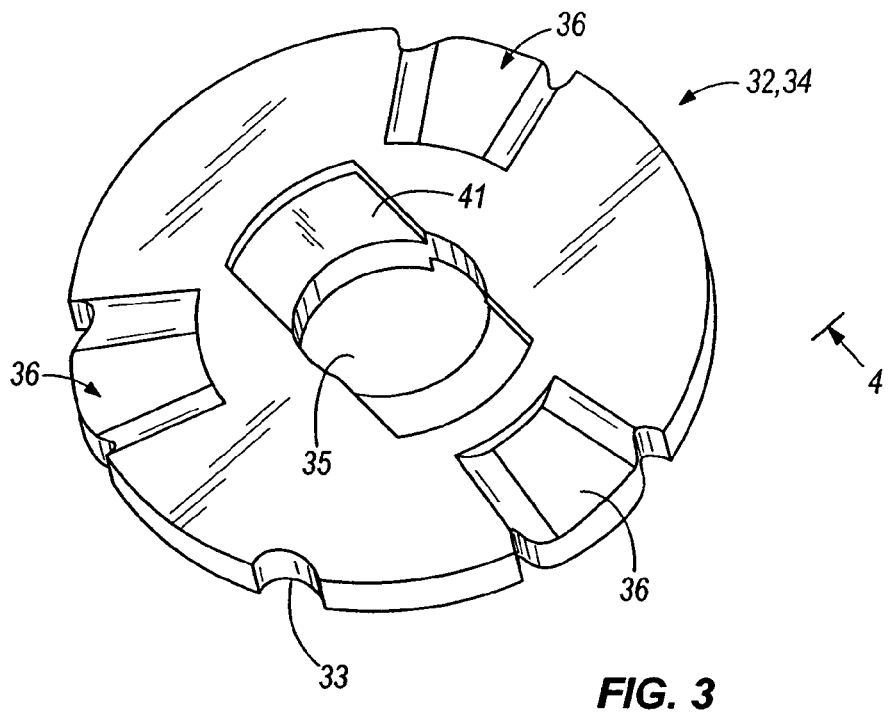
FIG. 3 is an isometric view of a cam plate in accordance with a first embodiment of the present invention.
Figure 4:
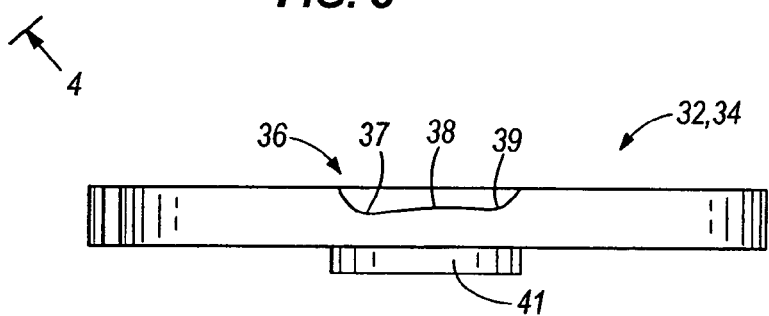
FIG. 4 is a side elevational view along the line 4—4 in FIG. 3.

The caming unit 30 generally comprises a pair of opposed cam plates 32 and 34 with a roller assembly 40 positioned therebetween. The preferred roller assembly 40 includes a plurality of rollers 44 maintained in a retainer plate 42. Referring to FIGS. 3 and 4, the preferred cam plates 32 and 34 will be described. Each cam plate 32, 34 is a generally planar disk with a central bore 35 configured to receive the tie bolt 12. One or more alignment notches 33 may be provided along the disk. For example, the notches 33 may align with a tab on the retainer clip 50 to ensure that the cams are in an initial locked position.

Figure 5:
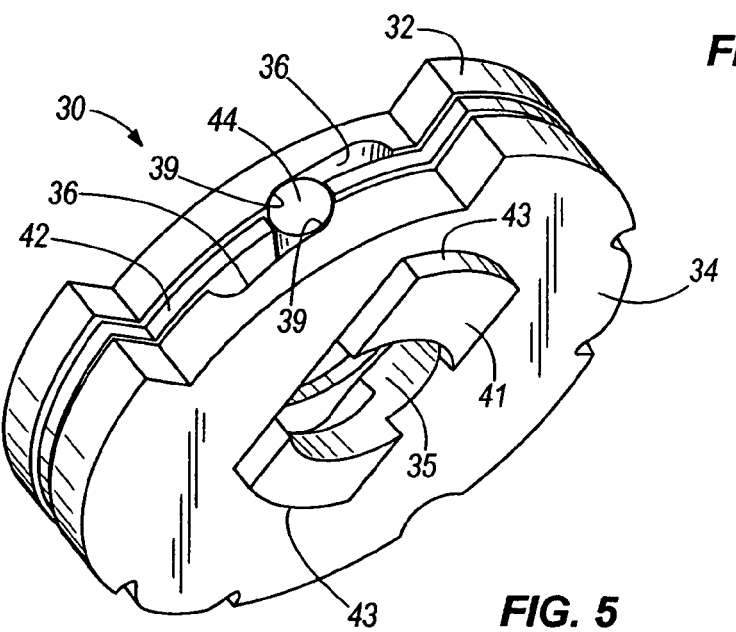
FIG. 5 is an isometric view of the caming unit of the cam locking assembly of FIG. 1 with a cut away portion removed for clarity.

One surface of the disk has a plurality of ramp recesses 36. In the preferred embodiment, three evenly spaced recesses 36 are provided. Fewer or more recesses 36 also may be provided. The recesses 36 include a deep trough portion 37 and a shallow trough portion 39, each configured to receive at least a portion of one of the rollers 44. A ramp 38 extends between the trough portions 37, 39. As shown in FIG. 5, the ramp recesses 36 on opposite plates 32, 34 are preferably reversed from one another, i.e., the ramps 38 of one of the plates 32 extend clockwise while the ramps 38 of the other plate 34 extend counter-clockwise. As such, in the unlocked position each roller 44 is positioned in a pair of opposed deep troughs 37. As the plates 32, 34 are rotated relative to one another, as will be explained hereinafter, the rollers 44 ride up the opposed ramps 38 until the rollers 44 are received in the respective shallow troughs 39. The positioning of the rollers 44 within the diminished depths of the shallow troughs 39 causes the plates 32 and 34 to push apart and thereby lock the steering column. The troughs 39 preferably have a semi-circular configuration such that the rollers 44 are retained therein.

The opposite side of each plate 32, 34 has a locking protrusion 41 extending therefrom. The preferred protrusion 41 is positioned about the central bore 35 and has an elongated configuration with opposed flat sides 43. The protrusion 41 may have various configurations. Furthermore, more than one protrusion may be provided. The protrusion 41 of plate 32 is configured to be received in the bore 26 of the lever plate 24 such that cam plate 32 rotates in conjunction with the rotation of the lever plate 24. Other means of securing the cam plate 32 to the lever plate 24 may also be used. The protrusion 41 of plate 34 is received in a bore 104 of the column mounting arm (see FIG. 6) to prevent rotation of the plate 34. With respect to engagement, each plate 32, 34 may alternatively be provided with a receiving bore and the respective engagement surfaces, the lever plate 25 and mounting arm, be provided with protrusions. In the preferred embodiment, the protrusions 41 extending from the plates 32 and 34 are identical such that a single plate may be manufactured and utilized for both plates 32 and 34.

Figure 2:
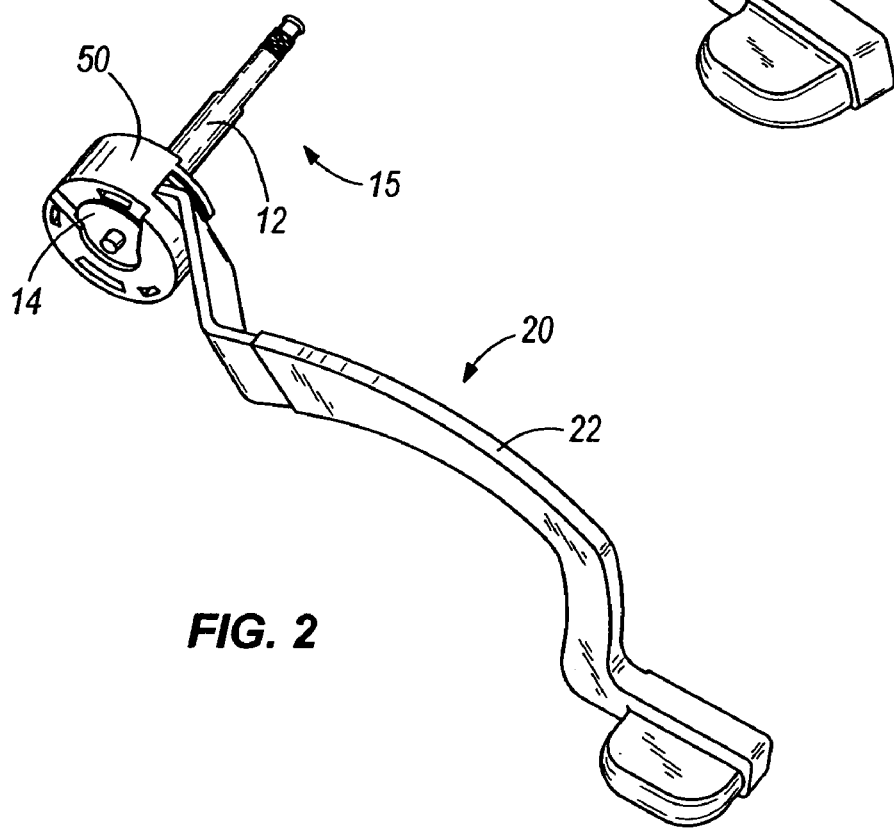
FIG. 2 is an isometric view of an assembled cam locking assembly of FIG. 1.
Figure 6:
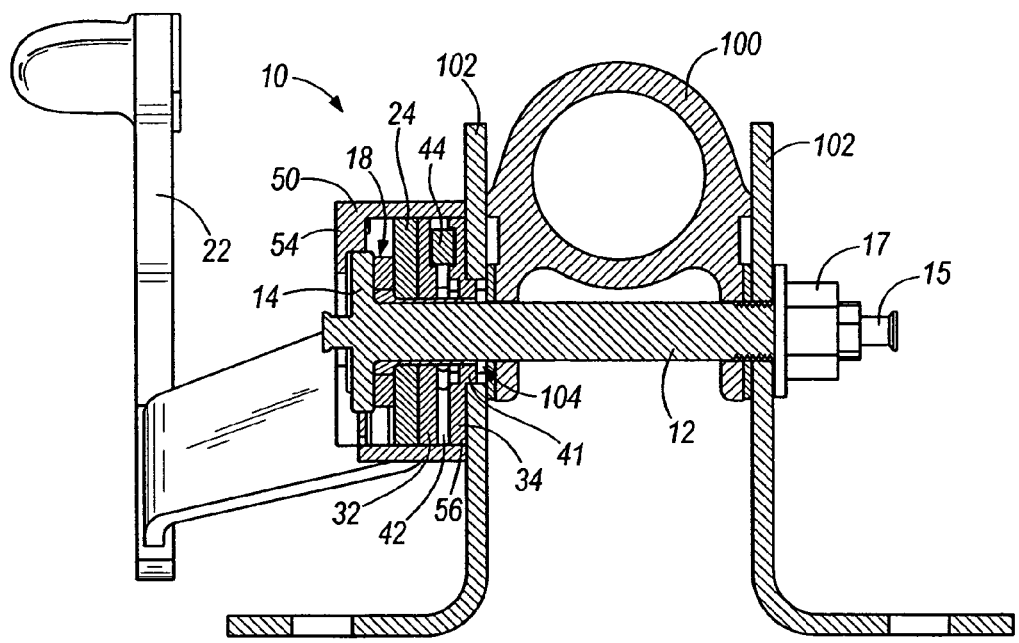
FIG. 6 is a cross-sectional elevational view of a cam locking assembly in accordance with FIG. 1 associated with a steering column assembly.

Referring to FIGS. 1, 2 and 6, a retainer clip 50 is preferably provided to unitize the cam locking assembly 10. The retainer clip 50 preferably has a first lip 54 configured to engage the retaining plate 14. The opposite end of the clip 50 has a second lip 56 configured to engage the fixed cam plate 34, thereby unitizing the cam locking assembly 10. In the preferred embodiment, the second lip 56 is configured such that upon securing of the cam locking assembly 10 onto a steering assembly, see FIG. 6, the moves out of the way to prevent trapping of the lip 56 between the cam plate 34 and the bracket 102. The retainer clip 50 includes a lever passage 52 configured to fit about the lever unit handle 22. The retainer clip 50 rotates with the lever unit 20 and therefore, the lever passage 52 can provide a close fit about the handle 22. The retainer clip 50 can be manufactured in various manners and is preferably molded from polypropylene or the like.

Referring to FIG. 6, the cam locking assembly 10 is assembled and the tie bolt 12 is passed through a steering column 100, positioned between a pair of opposed brackets 102. As the cam locking assembly 10 is positioned, the protrusion 41 of cam plate 34 is received in the bore 104 of bracket 102. The tie bolt 12 is then secured via the nut 17 or the like and the cam plate 34 is thereby fixed relative to the bracket 102. Rotation of the handle 22 causes rotation of cam plate 32 between a lock position wherein the rollers 44 are positioned in the shallow troughs 39, thereby applying pressure to the opposed brackets 102, and an open position wherein the rollers 44 align with the deep troughs 37 such that the pressure is relieved. The steering column 100 can then be adjusted. A wave spring (not shown) or the like may be provided to preload the assembly 10.

Figure 7:
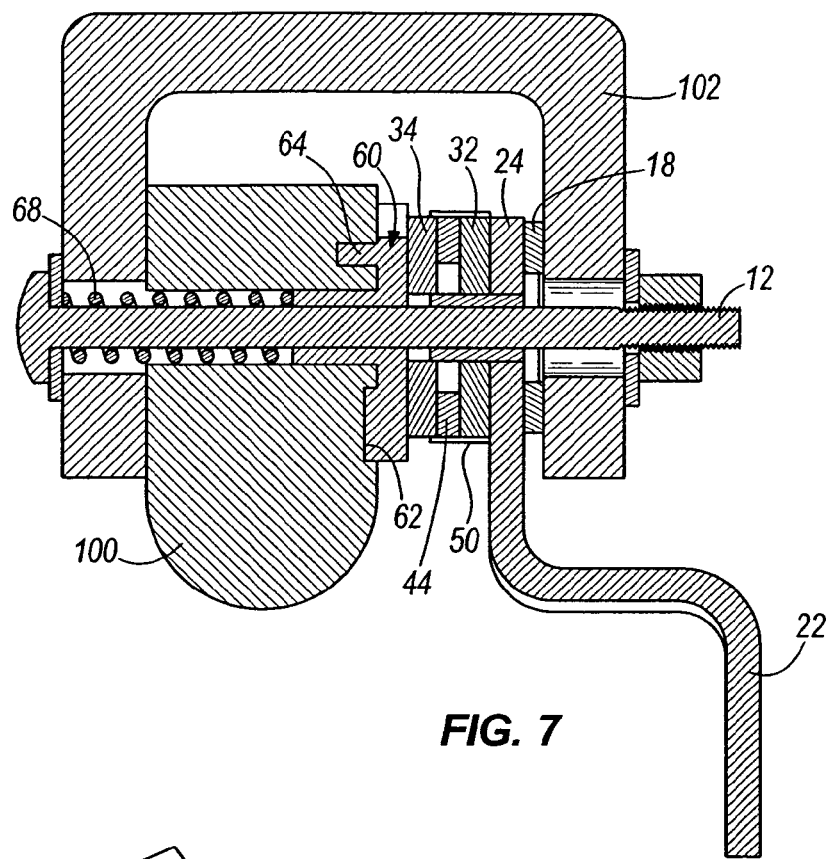
FIG. 7 is a cross-sectional elevational view of a cam locking assembly in accordance with a second embodiment associated with a steering column assembly.
Figure 8:
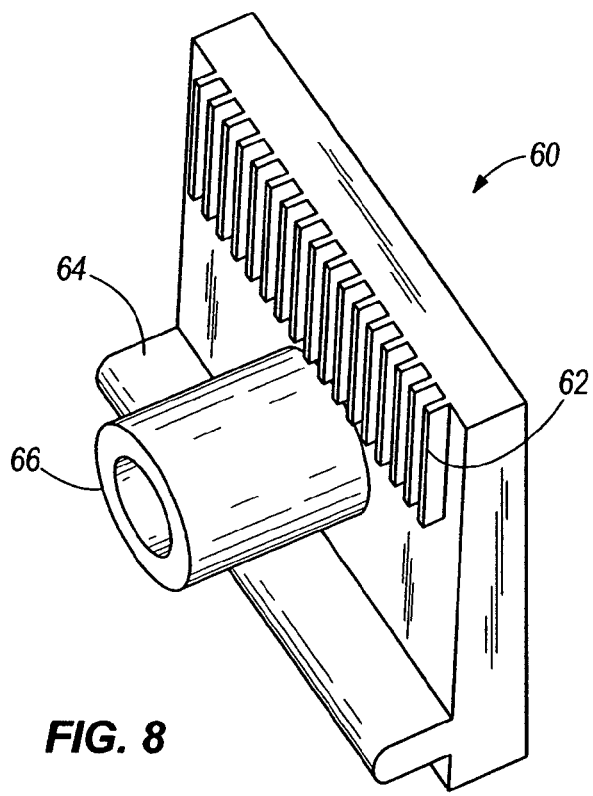
FIG. 8 is an isometric view of an exemplary spline plate used in conjunction with the cam locking assembly of FIG. 7.

Referring to FIGS. 7 and 8, an alternate embodiment of the present invention is shown. The cam locking assembly 10 is substantially the same as in the previous embodiment. However, cam plate 34 of the present invention is connected to a spline plate 60, instead of directly to the mounting bracket 102 or column 100. The spline plate 60 in turn has splines 62 which are configured to mate with splines (not shown) on the column 100 and an alignment protrusion 64 received in the column 100 to prevent rotation of the spline plate 60 or cam plate 34. The spline plate 60 may also include a sleeve 66 positioned about the shaft. The cam locking assembly 10 is positioned within the brackets 102. A spring 68 or the like is positioned about the tie bolt 12 and biases the spline plate 60 away from the column 100, such that upon release of the cam locking assembly 10, the spline plate 60 releases the column 100 such that it can be tilted or extended. As will be understood, the cam plate 34 may directly engage the steering column 100 or bracket 102 or other engagement means, including the above described spline plate 60.

What is claimed is:

1. A cam locking assembly comprising:
   a tie bolt;
   a lever unit positioned about and rotatable about the tie bolt; and
   a cam unit positioned about the tie bolt adjacent the lever unit, the cam unit comprising:
      first and second cam plates, each cam plate comprising a first surface having at least one roller retaining recess, the first and second cam plates positioned with the first surfaces facing one another with the retaining recesses aligned and one of the cam plates engaged by and moveable with the lever unit; and
      a roller positioned between the opposed retainer recesses.

2. The cam locking assembly of claim 1 wherein the first and second cam plates are substantially identical.

3. The cam locking assembly of claim 1 wherein each recess includes a shallow trough, a deep trough and a ramp extending therebetween.

4. The cam locking assembly of claim 3 wherein the recess of the first cam plate is configured such that the ramp extends from the deep trough to the shallow trough in a first direction and the recess of the second cam plate is configured such that the ramp extends from the deep trough to the shallow trough in a second, opposite direction.

5. The cam locking assembly of claim 1 wherein each cam plate has a second surface opposite the first surface and at least one protrusion extends from the second surface.

6. The cam locking assembly of claim 5 wherein each cam plate has a central bore and the protrusion extends about the central bore and has an elongated configuration with opposed flat sides.

7. The cam locking assembly of claim 6 wherein the lever unit includes a lever plate having a central aperture with an elongated configuration substantially the same as the configuration of the first cam plate protrusion.

8. The cam locking assembly of claim 1 wherein each cam plate includes three equally spaced retaining recesses.

9. The cam locking assembly of claim 1 further comprising a retainer clip positioned about a portion of the lever unit and the cam unit, the retainer clip configured to rotate with the lever unit.

10. The cam locking assembly of claim 9 wherein the lever unit includes a handle extending through a lever passage in the retainer clip, the lever passage having a close fit about the handle.

11. The cam locking assembly of claim 1 wherein the second cam plate engages a splined plate.

12. An adjustable steering column assembly comprising:
    a steering column;
    a support bracket; and
    cam locking assembly comprising:
       a tie bolt extending through the steering column and support bracket;
       a lever unit positioned about and rotatable about the tie bolt; and
       a cam unit positioned about the tie bolt adjacent the lever unit, the cam unit comprising:

first and second cam plates, each cam plate comprising a first surface having at least one roller retaining recess, the first and second cam plates positioned with the first surfaces facing one another with the retaining recesses aligned and one of the cam plates engaged by and moveable with the lever unit; and a roller positioned between the opposed retainer recesses.

13. The steering column assembly of claim 12 wherein the first and second cam plates are substantially identical.

14. The steering column assembly of claim 12 wherein each recess includes a shallow trough, a deep trough and a ramp extending therebetween.

15. The steering column assembly of claim 14 wherein the recess of the first cam plate is configured such that the ramp extends from the deep trough to the shallow trough in a first direction and the recess of the second cam plate is configured such that the ramp extends from the deep trough to the shallow trough in a second, opposite direction.

16. The steering column assembly of claim 12 wherein each cam plate has a second surface opposite the first surface and at least one protrusion extends from the second surface.

17. The steering column assembly of claim 16 wherein each cam plate has a central bore and the protrusion extends about the central bore and has an elongated configuration with opposed flat sides.

18. The steering column assembly of claim 17 wherein the lever unit includes a lever plate having a central aperture with an elongated configuration substantially the same as the configuration of the first cam plate protrusion.

19. The steering column assembly of claim 12 wherein each cam plate includes three equally spaced retaining recesses.

20. The steering column assembly of claim 12 further comprising a retainer clip positioned about a portion of the lever unit and the cam unit, the retainer clip configured to rotate with the lever unit.

21. The steering column assembly of claim 20 wherein the lever unit includes a handle extending through a lever passage in the retainer clip, the lever passage having a close fit about the handle.

22. The steering column assembly of claim 12 wherein the second cam plate engages a splined plate that engages splines extending along the steering column.

23. The steering column assembly of claim 12 wherein the support bracket includes spaced apart bracket arms and the steering column is positioned between the bracket arms and the cam locking assembly is positioned outside the bracket arms.

24. The steering column assembly of claim 12 wherein the support bracket includes spaced apart bracket arms and the steering column and the cam locking assembly are positioned between the bracket arms.

* * * * *

UNITED STATES PATENT AND TRADEMARK OFFICE
CERTIFICATE OF CORRECTION

PATENT NO. : 7,010,996 B2
APPLICATION NO. : 10/385885
DATED : March 14, 2006
INVENTOR(S) : Gary T. Schick, W. Richard Gist and Glenn Di Costanzo It is certified that error appears in the above-identified patent and that said Letters Patent is hereby corrected as shown below:

Title page,
Item [56], References Cited, FOREIGN PATENT DOCUMENTS, "DE 3720783" should be -- DE3920783 --.

Signed and Sealed this

Twentieth Day of June, 2006

JON W. DUDAS
*Director of the United States Patent and Trademark Office*